United States Patent
McCoy et al.

(10) Patent No.: US 10,022,619 B2
(45) Date of Patent: Jul. 17, 2018

(54) SYSTEM AND METHOD FOR MULTI-PLAYER VIDEO GAMING

(71) Applicants: SONY CORPORATION, Tokyo (JP); SONY NETWORK ENTERTAINMENT INTERNATIONAL LLC, Los Angeles, CA (US)

(72) Inventors: Charles McCoy, Coronado, CA (US); True Xiong, San Diego, CA (US); Clay Fisher, San Diego, CA (US)

(73) Assignee: Sony Interactive Entertainment, LLC, San Mateo, CA (US)

( * ) Notice: Subject to any disclaimer, the term of this patent is extended or adjusted under 35 U.S.C. 154(b) by 197 days.

(21) Appl. No.: 14/256,231

(22) Filed: Apr. 18, 2014

(65) Prior Publication Data

US 2015/0297997 A1   Oct. 22, 2015

(51) Int. Cl.
*A63F 13/00*    (2014.01)

(52) U.S. Cl.
CPC ................................. *A63F 13/00* (2013.01)

(58) Field of Classification Search
CPC ................................. A63F 13/25; A63F 13/30
USPC ................................................. 463/31, 42
See application file for complete search history.

(56) References Cited

U.S. PATENT DOCUMENTS

| | | | | |
|---|---|---|---|---|
| 5,748,198 A * | 5/1998 | Takeda | ................... | A63F 13/10 345/441 |
| 5,865,624 A * | 2/1999 | Hayashigawa | ......... | G09B 9/04 434/29 |
| 6,010,403 A * | 1/2000 | Adam | ................... | A63F 13/08 434/66 |
| 8,226,476 B2 | 7/2012 | Haltovsky et al. | | |
| 8,414,372 B2 | 4/2013 | Cannon et al. | | |
| 8,647,206 B1 | 2/2014 | Gottlieb | | |
| 8,858,313 B1 * | 10/2014 | Selfors | ................... | A63F 13/335 463/42 |
| 2005/0164789 A1 | 7/2005 | Nakamura et al. | | |
| 2006/0025214 A1 * | 2/2006 | Smith | ................... | A63F 13/12 463/30 |
| 2007/0087830 A1 * | 4/2007 | Varma | ................... | A63F 13/12 463/42 |
| 2010/0009747 A1 * | 1/2010 | Reville | ................... | A63F 13/12 463/31 |
| 2010/0056280 A1 * | 3/2010 | Langan | ................... | A63F 13/12 463/42 |

(Continued)

OTHER PUBLICATIONS

Minh Hong Tran, et al., "Dual Monitors Support Group Awareness in Multiplayer Computer Games", (http://www.researchgate.net/publication/37376280_Dual_monitors_support_group_awareness_in_multiplayer_computer_games/file/d912f50adc4cc0d9a2.pdf), Oct. 26, 2004, pp. 5.

(Continued)

*Primary Examiner* — Corbett B Coburn
(74) *Attorney, Agent, or Firm* — Chip Law Group

(57) ABSTRACT

A system includes a first gaming system communicatively coupled to a second gaming system via a communication network. The first gaming system receives the data from the second gaming system and displays on a first display device of the first gaming system one or more viewing modes associated with a game being rendered at the second gaming system. The viewing modes, herein correspond to plurality of views of a user associated with the second gaming system.

21 Claims, 4 Drawing Sheets

(56) References Cited

U.S. PATENT DOCUMENTS

| | | | | |
|---|---|---|---|---|
| 2010/0103244 | A1* | 4/2010 | Brandsma | H04N 7/144 348/14.08 |
| 2011/0237324 | A1* | 9/2011 | Clavin | G06K 9/00369 463/29 |
| 2011/0246908 | A1* | 10/2011 | Akram | H04N 21/23431 715/752 |
| 2011/0316853 | A1* | 12/2011 | Bar-Zeev | G06T 15/20 345/420 |
| 2012/0172117 | A1* | 7/2012 | Doorgeest | A63F 13/26 463/31 |
| 2013/0196761 | A1* | 8/2013 | Doorgeest | A63F 13/87 463/31 |
| 2013/0307920 | A1* | 11/2013 | Cahill | H04N 7/15 348/14.03 |
| 2014/0113725 | A1* | 4/2014 | Gottlieb | A63F 13/12 463/40 |
| 2014/0143687 | A1* | 5/2014 | Tan | G06F 3/1462 715/757 |
| 2014/0195675 | A1* | 7/2014 | Silver | H04L 65/1083 709/224 |
| 2014/0221087 | A1* | 8/2014 | Huang | G06F 9/45533 463/31 |
| 2014/0233559 | A1* | 8/2014 | Zhong | H04L 67/38 370/352 |
| 2014/0282111 | A1* | 9/2014 | Gurbag | H04L 65/403 715/756 |
| 2014/0337527 | A1* | 11/2014 | Jain | G06Q 30/0201 709/225 |
| 2015/0131969 | A1* | 5/2015 | Taraki | H04N 5/76 386/248 |
| 2015/0298010 | A1* | 10/2015 | Trombetta | A63F 13/87 463/42 |
| 2016/0071491 | A1* | 3/2016 | Berryman | G06F 3/0484 345/173 |
| 2016/0310852 | A1* | 10/2016 | Liao | A63F 13/86 |

OTHER PUBLICATIONS

Office Action for CN Patent Application No. 201510181908.1, dated Sep. 22, 2017, 06 pages of Office Action and 06 pages of English Translation.

* cited by examiner

SYSTEM AND METHOD FOR MULTI-PLAYER VIDEO GAMING

FIELD

Various embodiments of the disclosure relate to video gaming. More specifically, various embodiments of the disclosure relate to multi-player video gaming.

BACKGROUND

A variety of game consoles available for video gaming have gained popularity in recent years. The games played on the game consoles may utilize a network to connect the players to each other. The games may be played in a multi-player mode or a single-player mode. In a multi-player mode, a group of players connect over a network to participate in a single video game. While playing the game, each of the groups of players may operate individual handheld controllers to control their respective characters.

The groups of players may play the game while being in close proximity with each other or may play the game while being located at geographically distant locations. Each of the players may belong to either same team or different teams when involved in team play. However, when the players are located at geographically distant locations with respect to each other, it may be difficult to formulate a team strategy for the game while keeping all the players in loop.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method are provided for multi-player video gaming substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a system and method for multi-player video gaming. Exemplary aspects of the method may comprise a first gaming system communicatively coupled to a second gaming system. The first gaming system may be operable to receive metadata from the second gaming system. The metadata may comprise one or more viewing modes associated with a game being rendered at the second gaming system. The one or more viewing modes may correspond to in-game views of a user associated with the second gaming system.

In an embodiment, the one or more viewing modes associated with the game may be rendered at the first gaming system. In an embodiment, the first gaming system may simultaneously display the one or more viewing modes and the game being rendered at the first gaming system.

In an embodiment, the one or more viewing modes that correspond to the user of the second gaming system may comprise one or more pre-defined views of a character associated with the user of the second gaming system. In an embodiment, the first gaming system may be operable to resize a playing area of the game being rendered at the first gaming system, to display a plurality of regions.

In an embodiment, the first gaming system may be operable to display the one or more viewing modes associated with the second gaming system in one of the plurality of regions. In an embodiment, the one or more viewing modes may correspond to one or more real-time video feeds associated with the game being rendered. In an embodiment, the first gaming system may be communicatively coupled to the second gaming system via a remote server.

Figure 1:
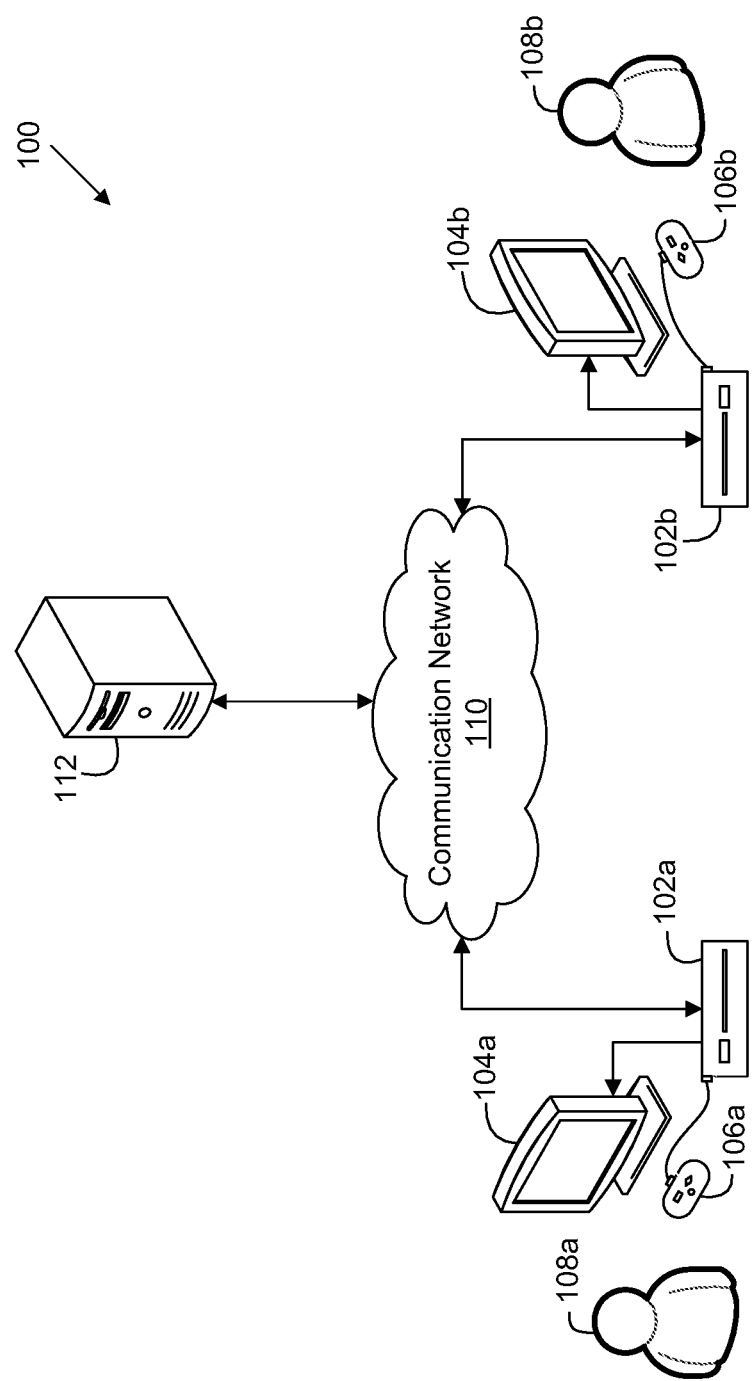
FIG. 1 is a block diagram illustrating a network environment for multi-player video gaming, in accordance with an embodiment of the disclosure.

FIG. 1 is a block diagram illustrating a network environment 100 for multi-player video gaming, in accordance with an embodiment of the disclosure. With reference to FIG. 1, there is shown a network environment 100. The network environment 100 may comprise a first gaming system 102a, a second gaming system 102b, a first display device 104a, a second display device 104b, a first remote controller 106a, a second remote controller 106b, a first user 108a, a second user 108b, a communication network 110, and a server 112.

The first gaming system 102a may comprise suitable logic, circuitry, interfaces, and/or code that may be enable communication with the remote server 112 and/or the second gaming system 102b. In an embodiment, the first gaming system 102a may be operable to communicate directly with the second gaming system 102b. In an embodiment, the first gaming system 102a may be operable to communicate with the second gaming system 102b via the remote server 112. In an embodiment, the first gaming system 102a may be operable to receive multimedia content from the second gaming system 102b. In an embodiment, the first gaming system 102a may be operable to receive multimedia content from the remote server 112. Examples of the multimedia content may include, but are not limited to, games, add-on content, playable demos, movie trailers, movies, videos, themes, applications, and/or updates on latest multimedia content. Examples of the first gaming system 102a may include a game console.

In an embodiment, the first gaming system 102a may execute a plurality of program codes that may be stored on a removable medium and/or disk. In another embodiment, the first gaming system 102a may receive an electrical signal via a wired cable from a plurality of devices, such as a Universal Synchronous Bus (USB) and/or Peripheral Component Interconnect (PCI). Examples of such devices may include, but are not limited to, a smartphone, a touch screen device, a laptop, a tablet computer, a television, a video display, and/or a personal digital assistant (PDA) device. In an embodiment, the first gaming system 102a may remotely communicate with the first remote controller 106a via a wired connection or short-range communication.

The first gaming system 102a and the second gaming system 102b may be connected to the first display device 104a and the second display device 104b, respectively, via a wired connection. In an embodiment, the first gaming system 102a and the second gaming system 102b may be connected to each other using a cable, such as a cross-over cable.

For the sake of brevity, all the elements of the first gaming system 102a and the second gaming system 102b are shown identical in configuration and circuitry. However, different configurations and circuitry may be deployed in the first gaming system 102a and the second gaming system 102b, without departing from the scope of the present disclosure. In an embodiment, the plurality of gaming systems connected to each other may or may not be assembled from the same manufacturer.

In an embodiment, the first gaming system 102a may be connected to the first display device 104a via a wired connection. However, the connection between the first gaming system 102a and the first display device 104a may extend to a wireless connection or other suitable connection. In an embodiment, the first gaming system 102a may utilize a wireless adapter to connect to the first display device 104a.

The first display device 104a may comprise suitable logic, circuitry, interfaces, and/or code that may be operable to connect to the first gaming system 102a. The first display device 104a may be operable to display multimedia content from the first gaming system 102a. In an embodiment, the first display device 104a may communicate with the first remote controller 106a via a short-range communication network. Examples of the first display device 104a may include, but are not limited to, a touch screen device, a laptop, a tablet computer, a television, a video display, a Cathode Ray Tube (CRT) monitor and/or television, Light Emitting Diode (LED) monitor and/or television, Liquid Crystal Display (LCD) monitor and/or television, a smartphone, and/or a personal digital assistant (PDA) device.

The first display device 104a may comprise suitable logic, circuitry, interfaces, and/or code that may be operable to provide a display of the multimedia content. The first display device 104a may be further operable to render display of one or more features and/or applications of the first gaming system 102a. In an embodiment, the first display device 104a may be further operable to receive an input from the first user 108a, via a touch-sensitive screen. The first display device 104a may be realized through several known technologies, such as, but not limited to, LCD display, LED display, Organic LED (OLED) display technology, CRT, and/or the like.

The first remote controller 106a may comprise suitable logic, circuitry, interfaces, and/or code that may be operable to communicate with the first display device 104a and/or the first gaming system 102a. The first remote controller 106a may provide a plurality of input commands to the game being rendered on the first display device 104a, in order to control one or more characters in the game being played. In an embodiment, the first remote controller 106a may be connected to the first gaming system 102a via a wired connection. In another embodiment, the first remote controller 106a may be connected to the first gaming system 102a utilizing wireless communication protocols. Examples of the first remote controller 106a may include, but are not limited to, a keyboard, a mouse, a joystick, a gamepad, a paddle, a trackball, and/or a touch screen device. Further, the first remote controller 106a may include a plurality of game controllers assembled by a manufacturer of the first gaming system 102a. In an embodiment, the first remote controller 106a may include a plurality of game controllers designed to play a specific genre of games, such as shooting games and/or car-racing games. The first user 108a and the second user 108b may communicate with the first gaming system 102a and the second gaming system 102b, via the first remote controller 106a and the second remote controller 106b, respectively.

The communication network 110 may comprise a medium through which the first gaming system 102a may communicate with the remote server 112 and/or the second gaming system 102b. Examples of the communication network 110 may include, but are not limited to, the Internet, a Wireless Fidelity (Wi-Fi) network, an ad-hoc wireless network, a Wireless Local Area Network (WLAN), a Local Area Network (LAN), a telephone line (POTS), and/or a Metropolitan Area Network (MAN). Various devices in the network environment 100 may be operable to connect to the communication network 110, in accordance with various wired and wireless communication protocols, such as Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In an embodiment, the first gaming system 102a and the second gaming system 102b may be connected directly to each other using a wired connection, such as an Ethernet crossover cable. In an embodiment, the first gaming system 102a and the second gaming system 102b may be connected to each other via a switch and/or a hub, such as an Ethernet hub. In an embodiment, the first gaming system 102a and the second gaming system 102b may be connected to each other through a peer-to-peer network using various peer-to-peer protocols, such as Direct Connect.

In an embodiment, the first gaming system 102a and the second gaming system 102b may be connected to each other via a wireless network, such as an ad-hoc wireless network, the Internet, and the like. In such an embodiment, the first gaming system 102a and the second gaming system 102b may be provided with a wireless adapter, such as a network interface controller, to connect to the wireless network. In an embodiment, the first gaming system 102a and the second gaming system 102b may be provided with a wireless capability to connect to a wireless network, such as Wi-Fi. In an embodiment, the first gaming system 102a or the second gaming system 102b may perform the role of a base station for a Wi-Fi network such that other gaming systems communicating with the first gaming system 102a or the second gaming system 102b may connect to the Wi-Fi network via the base station.

The remote server 112 may comprise suitable logic, circuitry, interfaces, and/or code that may be operable to host a plurality of applications. Such plurality of applications may include, but are not limited to, games, add-on content, playable demos, movie trailers, movies, videos, themes, applications, updates related to firmware, audio-visual conferences, and/or live video sessions.

The remote server 112 may facilitate multi-party network games between the first gaming system 102a and the second gaming system 102b, and/or other gaming systems communicating with the remote server 112. Examples of such multi-party network games may include, but are not limited to, racing games, card games, combat games, championship games, and/or the like. In an embodiment, the functionality or the role of the remote server 112 may be executed by the first gaming system 102a, the second gaming system 102b, or other gaming systems connected to the communication network 110. The first gaming system 102a or the second gaming system 102b acts as a server that facilitates communication with other gaming systems. In an embodiment, the remote server 112 may be part of the first gaming system 102a or the second gaming system 102b or other gaming systems connected to the communication network 110.

In operation, the first gaming system 102a may receive metadata from the second gaming system 102b. The metadata may comprise one or more viewing modes associated with a game being rendered at the second gaming system 102b. In an embodiment, the viewing modes may correspond to in-game views of the second user 108b, associated with the second gaming system 102b.

In an embodiment, the first gaming system 102a may receive the metadata directly from the second gaming system 102b. In an embodiment, the first gaming system 102a may receive the metadata from the remote server communicating with second gaming system 102b.

In an embodiment, the one or more viewing modes may correspond to one or more out-of-game views of a plurality of users. The one or more out-of-game views may include, but are not limited to, one or more views of the plurality of users captured from one or more image capturing devices, such as a web-camera.

In an embodiment, the one or more viewing modes associated with the game may be rendered at the first gaming system 102a. In an embodiment, the one or more views rendered at the first gaming system 102a may be displayed simultaneously with the game being rendered at the first gaming system 102a.

In an embodiment, the one or more viewing modes that correspond to the second user 108b of the second gaming system 102b, may comprise one or more views of a character associated with the second user 108b in the game. In an embodiment, the one or more viewing modes that correspond to the user of the second gaming system 102b, may comprise one or more pre-defined views of a character associated with the second user 108b in the game.

In an embodiment, the one or more viewing modes may be displayed on a second display device 104b different from the first display device 104a displaying the game. In an embodiment, the first gaming system 102a may be operable to resize a playing area to display a plurality of regions of the game being rendered at the first gaming system 102a.

In an embodiment, the first gaming system 102a may be operable to display one or more statistics associated with the game in one of the plurality of regions. In an embodiment, the first gaming system 102a may be operable to display the one or more viewing modes associated with the second gaming system 102b, in one of the plurality of regions.

In an embodiment, the metadata may comprise one or more of data for instant messaging, text-based chatting, gaming system messaging, social media monitoring, shared images, audio-video data, and/or invitations to other games. In an embodiment, the one or more viewing modes may correspond to one or more real-time video feeds associated with the game being rendered.

In an embodiment, the first user 108a and the second user 108b, associated with the first gaming system 102a and the second gaming system 102b, respectively, may be located remotely with respect to each other. In an embodiment, the first gaming system 102a and the second gaming system 102b may exchange information with the remote server 112 and/or with each other via the communication network 110.

In an embodiment, the first gaming system 102a may display a variety of multimedia content by resizing a graphical user interface (GUI) of the first display device 104a into a plurality of regions. The content to be displayed on the plurality of regions of the first display device 104a may be set by the first user 108a. In an embodiment, the plurality of regions of the GUI of the first display device 104a may be displayed in a grid-like manner. Each of the plurality of regions may be sized evenly or sized differently. In another embodiment, a playing area of a game may be displayed at the center of the grid-like display of the GUI of the first display device 104a. The multimedia content may be displayed in the plurality of regions positioned around the playing area of the game. In an embodiment, the plurality of regions on the GUI of the first display device 104a may display varied multimedia content in a picture-in-picture format.

In an embodiment, the first gaming system 102a may utilize a grid of eight display devices to provide additional screen space. The central display device may display a playing area of the game being played by the first user 108a. The other seven displays out of the eight displays may be utilized to display video feeds of other network players. In an embodiment, a plurality of display devices that may be linked to corresponding plurality of gaming systems may be positioned in a grid-like manner to provide the additional screen space required to display the multimedia content. Each display device of the plurality of display devices may display a different feature and/or application of the game being played by the first user 108a, associated with the first gaming system 102a.

In another embodiment, the playing area of the game played by the first user 108a, may be displayed on the first display device 104a. However, a variety of multimedia content may be displayed on a plurality of other display devices linked with the first display device 104a and or the first gaming system 102a, via Universal Synchronous Bus (USB) interface or Peripheral Component Interconnect (PCI) or suitable means known in the art.

In an embodiment, the first gaming system 102a may display different perspective views of the second user 108b or other users in the game being rendered based on the metadata received from the second gaming system 102b. In an embodiment, the first gaming system 102a may display different perspective views of the second user 108b, or other users in the game being rendered, based on the metadata received from the remote server 112. In an embodiment, the different perspective views of the second user 108b may comprise real-time views or online video feeds of in-game characters associated with such users in an ongoing game being played by the first user 108a.

In an embodiment, the first gaming system 102a may display different perspective views of the second user 108b or other users in the game being rendered based on the metadata received from the second gaming system 102b. In an embodiment, the first gaming system 102a may display different perspective views of the second user 108b, or other users in the game being rendered, based on the metadata received from the remote server 112. In an embodiment, the different perspectives may comprise real-time views or online video feeds of characters associated with users in a game different from the game being played by the first user 108a. For example, the first user 108a may be playing a car-racing game and the second user 108b may be playing a wrestling game. The first gaming system 102a may display different perspective views of a wrestling character associated with the second user 108b, on the first display device 104a.

In an embodiment, the first gaming system 102a may be further operable to display historic video feeds of other players in the game based on the received metadata from the second gaming system 102b or other gaming systems communicating with the first gaming system 102a. In an embodiment, the first gaming system 102a may be further operable to display historic video feeds of other players in a game based on the received metadata from the remote server 112. The historic views may include video feeds of characters associated with the other players in the game at pre-defined time intervals.

In an embodiment, the first user 108a may be playing a game of chess and the second user 108b may be playing a car-racing game. The processor 202 may be operable to display a position of a car associated with the second user 108b, in the second lap in a ten-lap race while the second user 108b is currently in the sixth lap. In an embodiment, the first user 108a and the second user 108b may be playing the same car-racing game. The processor 202 may be operable to display the car associated with the second user 108b, from a previous lap of the second user 108b.

In an embodiment, the first gaming system 102a may be operable to display a plurality of views of the second user 108b, or other known players in a game. Such views enable the first user 108a to capture facial expressions of the second user 108b, or other users being monitored. The monitoring of the facial expressions by the first user 108a may be crucial in a variety of games involving decision making. Examples of the plurality of views of the second user 108b may include, but are not limited to, a front view, a back view, a top view, a zoom-in view, a zoom-out view, and/or the like. In an embodiment, the plurality of views may be captured by one or more image-capturing devices (not shown) installed at the physical location of the second user 108b. Examples of the image-capturing devices may include, but are not limited to, a built-in camera, a surveillance camera, an internet protocol (IP) camera, a motion detector camera, a motion sensor camera, a remote camera, a range-finder camera, and/or a three-dimensional (3-D) laser camera.

In an embodiment, the first gaming system 102a may be operable to facilitate live chat sessions between players in a game through the remote server 112. The live chat sessions may be displayed in a picture-in-picture format on the first display device 104a. In an embodiment, the live chat sessions and sharing of media files among the group of players may be facilitated by one of the second gaming system 102b or other gaming systems communicating with the first gaming system 102a. In an embodiment, the live chat sessions and sharing of media files among the group of players engaged in gaming may be facilitated by the remote server 112. Examples of media files may include, but are not limited to, audio files, video files, images, news, text files, and/or other files of interest to be shared among the group of players. In an embodiment, one of the second gaming system 102b or other gaming systems communicating with the communication network 110 may enable invitations to latest and/or newest games to be shared among players in the game. In an embodiment, the remote server 112 may enable invitations to latest and/or newest games to be shared among players in the game. The game played among players while sharing media files may be the same game or a different game.

Figure 2:
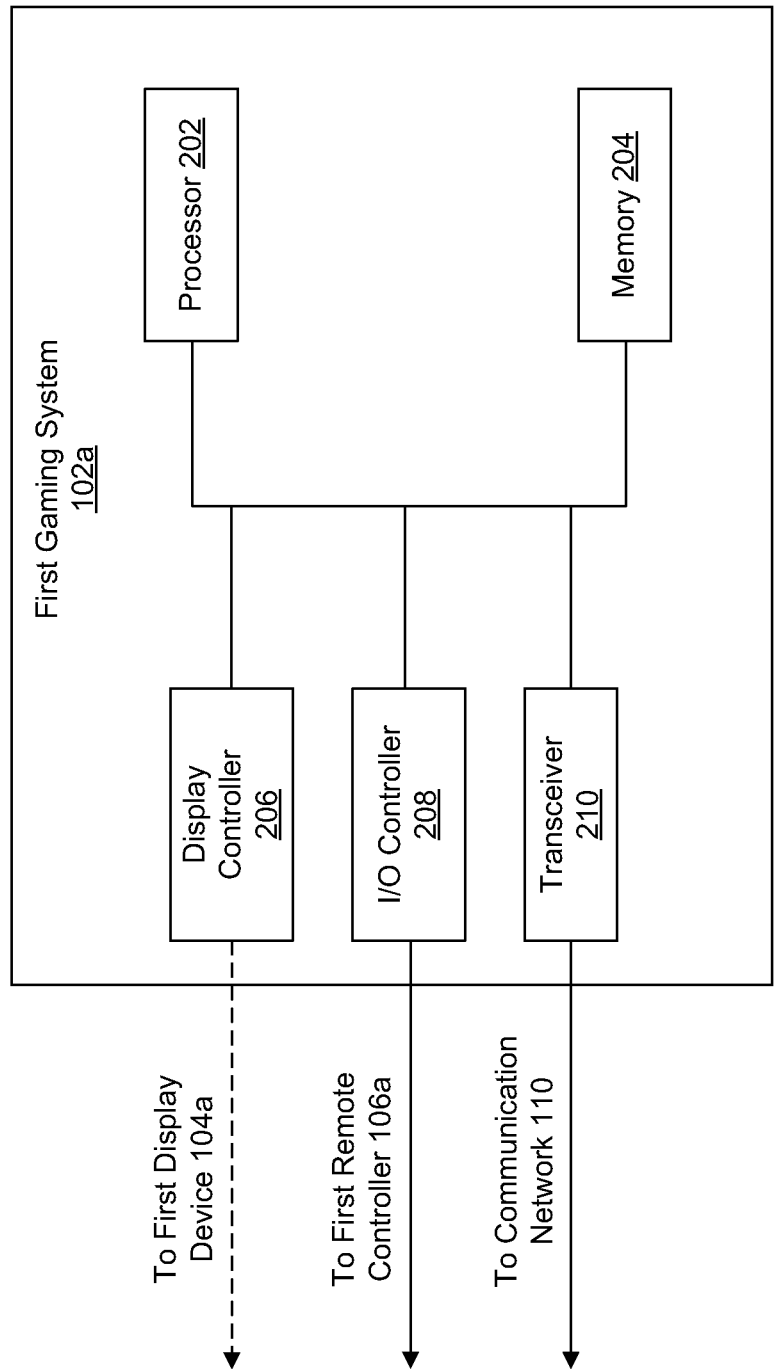
FIG. 2 is a block diagram illustrating an exemplary computing device, in accordance with an embodiment of the disclosure.

FIG. 2 is a block diagram illustrating an exemplary computing device, in accordance with an embodiment of the disclosure. FIG. 2 is explained in conjunction with elements from FIG. 1. With reference to FIG. 2, there is shown a first gaming system 102a. The first gaming system 102a may comprise one or more processors, such as a processor 202, a memory 204, a display controller 206, an input/output (I/O) device controller 208, and a transceiver 210.

The processor 202 may be communicatively coupled to the memory 204, display controller 206, the I/O device controller 208, and the transceiver 210. The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may comprise suitable logic, circuitry, interfaces, and/or code that may be operable to store the received set of instructions. The memory 204 may store a plurality of multimedia content that the processor 202 may display on the first display device 104a. The memory 204 may be communicatively coupled with a secondary storage device, for example, a hard disk or external storage device, such as a compact disc (CD). Such a communicative coupling may enable the memory 204 to buffer multimedia content retrieved from the secondary storage device or the external storage device.

The memory 204 may be implemented by the use of various multimedia database management systems that are well known to those skilled in the art. The memory 204 may be implemented based on, but not limited to, a Random Access Memory (RAM), a Read-Only Memory (ROM), a Hard Disk Drive (HDD), a storage server and/or a Secure Digital (SD) card. The display controller 206 may be operable to control one or more display devices, such as the first display device 104a. The display controller 206 may comprise suitable logic, circuitry, interfaces, and/or code that may be operable to generate audio and/or video signals for a plurality of games being rendered on the first display device 104a. Further, the display controller 206 may be operable to control necessary timing of a plurality of video synchronization signals to enable rendering of the plurality of games on the first display device 104a. In an embodiment, the display controller 206 may be a graphics-card and/or a graphics processing unit (GPU).

The I/O device controller 208 may be operable to control one or more input/output (I/O) devices, such as the first remote controller 106a. The I/O device controller 208 may comprise various interfaces between the I/O devices and the processor 202. In an embodiment, the I/O device controller 208 may be an add-on software or hardware, which allows connection of additional I/O devices to the first gaming system 102a. The I/O device controller 208 may be connected to a plurality of I/O devices. Examples of the input devices may include, but are not limited to, the first remote controller 106a, a keyboard, a mouse, a joystick, a touch screen, a microphone, and/or a camera. Examples of the output devices may include, but are not limited to, the first display device 104a and a speaker. In an embodiment, the first remote controller 106a may be connected wirelessly to the first gaming system 102a via I/O device controller 208.

The transceiver 210 may be coupled to the communication network 110. The transceiver 210 may comprise suitable logic, circuitry, interfaces, and/or code that may be operable to communicate with the remote server 112 via various communication interfaces. The transceiver 210 may implement known technologies for supporting wired or wireless communication with the communication network 110. Examples of the transceiver 210 may include, but are not limited to, an antenna, a radio frequency (RF) transceiver, one or more amplifiers, a tuner, one or more oscillators, a digital signal processor (DSP), a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use a plurality of communication standards, protocols and technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be operable to receive metadata from the second gaming system 102b. The metadata may comprise one or more viewing modes associated with a game being rendered at the second gaming system 102b. The viewing modes correspond to in-game views of a user associated with the second gaming system 102b.

In an embodiment, the processor 202 may receive the metadata directly from the second gaming system 102b. In an embodiment, the processor 202 may receive the metadata from the remote server communicating with second gaming system 102b.

In an embodiment, the first user 108a may provide one or more instructions to the game rendered on the first display device 104a via the first remote controller 106a. The instructions may be generated based on a selection of alphanumeric characters or pressing of a pre-specified button on the first remote controller 106a.

In an embodiment, the processor 202 may be operable to execute instructions enabling provision of multiple third-party services, such as a video on demand service, photo-editing service, and/or the like.

Figure 3:
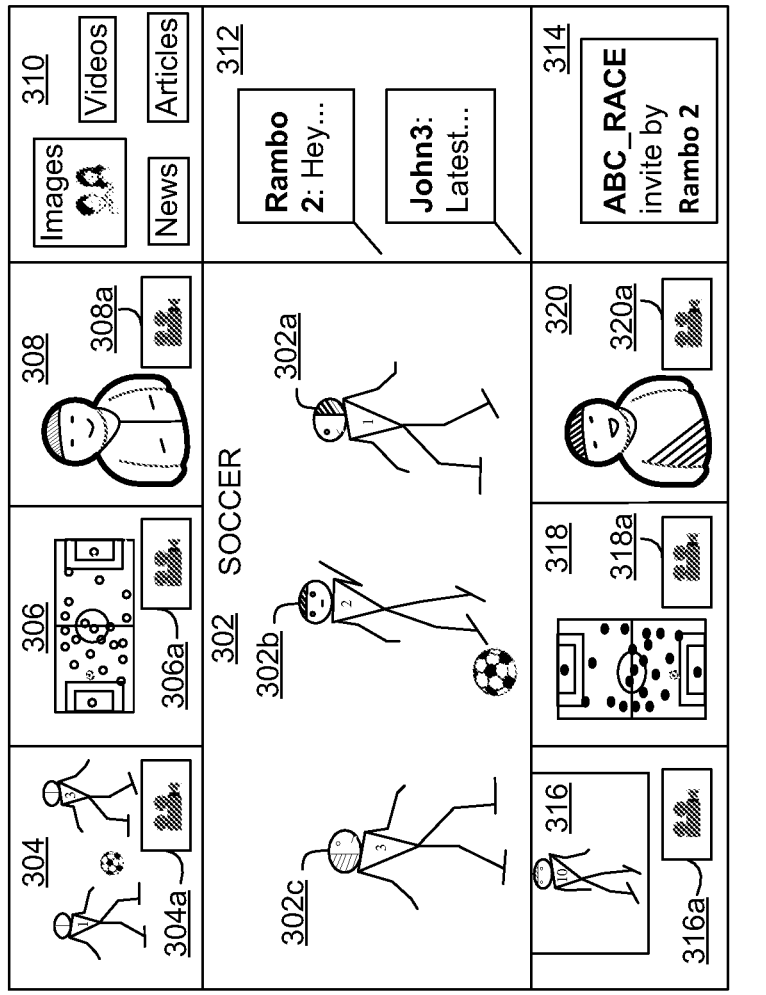
FIG. 3 is a diagram illustrating an exemplary scenario for implementing the disclosed system, in accordance with an embodiment of the disclosure.

FIG. 3 is a diagram illustrating an exemplary scenario for implementing the disclosed system, in accordance with an embodiment of the disclosure. FIG. 3 is explained in conjunction with elements from FIG. 1 and FIG. 2. With reference to FIG. 3, there is shown a screen shot of a GUI 300 of the first display device 104a. The GUI 300 of the first display device 104a comprises a plurality of regions. The plurality of regions comprises a game playing window 302, a first view window 304, a second view window 306, a second player camera view 308, a multimedia-sharing window 310, an instant messaging (IM) window 312, a game invitation window 314, a third view window 316, a fourth view window 318, and a third player camera view 320.

As shown in FIG. 3, the first user 108a may select a game on the first display device 104a by utilizing one or more pre-defined buttons on the first remote controller 106a. In an embodiment, the game may be played by utilizing a game stored on an optical disc and/or a hard disk.

Based on receiving the selection of the game, such as, "soccer", the processor 202 may control the first display device 104a, to render one or more features of the selected game. The selection of the game may be received by the second display device 104b, associated with the second user 108b. In an embodiment, the first user 108a and the second user 108b may be engaged in the same game through their respective gaming systems, that is, the first gaming system 102a and the second gaming system 102b via the communication network 110. For the sake of simplicity, FIG. 3 will be described with reference to a first player 302a, which corresponds to the in-game character of the first user 108a and a second player 302b, which corresponds to the in-game character of the second user 108b.

The game playing window 302 displays a game of soccer being played in real time by the first user 108a. The game includes a plurality of players, such as the first player 302a, the second player 302b, and a third player 302c. The first player 302a and the second player 302b may belong to the same team while the third player 302c may belong to an opponent's team. The first user 108a may play the game by utilizing a plurality of functions and/or operation buttons on the first remote controller 106a.

A plurality of views of the second player 302b may be displayed on the GUI 300 of the first display device 104a. For the sake of simplicity, two in-game views of the second player 302b, in the first view window 304 and the second view window 306, have been shown.

The first view window 304 and the second view window 306 comprise in-game views of the second player 302b, associated with the second user 108b. The one or more real-time video feeds of the second player 302b comprises views of the second player 302b, in the game being played. In an embodiment, the views of the second player 302b may include, but are not limited to, a top view, a side view, a first-person view, an angular view, and/or the like.

In an embodiment, the first view window 304 displays a first-person view of the second player 302b when such a view is selected to be displayed by the first user 108a. The first gaming system 102a may display a real-time video feed of an environment (field-view) of the soccer game from the eyes of the second player 302b. As shown, the first-person view emulates the actual view of the second player 302b in the game. The second player 302b would see the first player 302a on the left and the third player 302c on the right. In such a case, the first user 108a may strategize the next move in the game based on a location of the second player 302b on the field. The ability of the first user 108a to view the real-time video feeds of the second player 302b, associated with the second user 108b, may prove beneficial when the location of the second player 302b is not captured in the current view being shown on the game playing window 302.

In an embodiment, an icon 304a may be provided on the first view window 304, to switch a current view of the second player 302b to a different view. The different view may be selected from a plurality of pre-defined views available. The first gaming system 102a may render the plurality of pre-defined views of the second player 302b on the GUI 300 of the first display device 104a. In an embodiment, the plurality of pre-defined views of the second player 302b may be rendered based on the metadata received from the second gaming system 102b or other gaming systems communicating with the first gaming system 102a. In an embodiment, the plurality of pre-defined views of the second player 302b may be rendered based on the metadata received from the remote server 112. The ability of the first user 108a to switch views among the plurality of pre-defined views available for the second player 302b, may enable the first user 108a to capture specific views of the second player 302b on the field of the game being played.

The second view window 306 displays a top-view of the game when such a view is selected to be displayed by the first user 108a. The first gaming system 102 may display a top-view of the field, similar to an eagle's-eye view capturing the second player 302b on the field of the game. As shown, 22 players playing the soccer game on the field are shown. In an embodiment, the second player 302b on the field may be identified by an identifier. Examples of the identifier may include, but are not limited to, highlighting, blinking, and/or labelling the second player 302b. In such a case, the location of the second player 302b on the field may be easily identified, and the first user 108a may move the first player 302a based on the captured location of the second player 302b. Similar to the first view window 304, the second view window 306 may be provided with an icon 306a, to switch a current view of the second player 302b to a different view from a plurality of pre-defined views.

In an embodiment, the plurality of views of the second player 302b in the game may be captured through a plurality of pre-defined viewpoints. Examples of the pre-defined viewpoints may include, but are not limited to, views captured from a goalpost, or a bottom view captured from shoes of the second player 302b, or a lateral view from either side of the field with the second player 302b as the focus of attention. A person with ordinary skill in the art will appreciate that the pre-defined viewpoints may vary based on the game selected to be played and the game environment being rendered on the first display device 104a.

In an embodiment, the plurality of views of the second player 302b, on the first view window 304 and the second view window 306, may be referred to as one or more viewing modes that correspond to in-game views of the second player 302b. The one or more viewing modes may be switched by the first user 108a, based on the icon 304a or icon 306a on the first view window 304 and the second view window 306, respectively.

The second player camera view 308 displays a front-view of the second user 108b, captured via one or more image capturing devices, such as a web-camera. The web cameras may be installed at the physical location of the second user 108b. The front-view may capture the facial expressions of the second user 108b. An icon 308a may be provided on the second player camera view 308, to switch a current view of the second user 108b to a different view. The different view may be chosen from a plurality of pre-defined views available based on the positions of the web cameras. In an embodiment, the first gaming system 102a may render such a plurality of pre-defined views of the second user 108b on the GUI 300 of the first display device 104a, based on the metadata received from the second gaming system 102b or other gaming systems communicating with the first gaming system 102a. In an embodiment, the first gaming system 102a may render such a plurality of pre-defined views of the second user 108b on the GUI 300 of the first display device 104a, based on the metadata received from the remote server 112.

Further, a plurality of views of the second user 108b may be captured by the image capturing devices. In an embodiment, the first user 108a may select one or more views to be displayed on the region that corresponds to the second player camera view 308. A person with ordinary skill in the art will appreciate that the front-view of the second user 108b is shown for illustration and the pre-defined views of the second user 108b may be selected to be displayed on the region that corresponds to the second player camera view 308.

In an embodiment, a plurality of views of users who correspond to the team players, such as the second user 108b, may be captured. The plurality of views comprises real-time video feeds of the second user 108b, which may be streamed via the remote server 112, the second gaming system 102b, or other gaming systems communicating with the first gaming system 102a. Such plurality of views of the second player 302b may facilitate live audio and/or video chatting and/or conferencing with the second user 108b. In an embodiment, the live audio and/or video chatting and/or conferencing with the team players may enable strategizing and planning of the game being played by the team. Such video conference gaming may allow the team players to exchange comments and/or suggestions with each other, thereby enabling team bonding and interaction.

The multimedia-sharing window 310 displays multimedia content shared between the first user 108a and the second user 108b. The multimedia-sharing window 310 may provide a medium for a group of players to interact by sharing and/or exchanging multimedia content. It is to be understood that the sharing of multimedia content is not limited to the two users, the first user 108a and the second user 108b, and may extend to a plurality of users on the communication network 110. Furthermore, the multimedia content may be shared with non-playing users or random users who may be playing the same game as the first user 108a. In an embodiment, the multimedia content may be shared with non-playing users or random users who may be playing a different game than the first user 108a. In such a case, the non-playing users or random users may be connected to the communication network 110 via their respective gaming systems. Examples of the multimedia content may include, but are not limited to, movie trailers, themes, applications, updates on latest multimedia content, audio files, video files, images, news, text files, and/or files of interest to be shared among a group of players. In an embodiment, the first user 108a may minimize the multimedia-sharing window 310 while playing a game.

The IM window 312 displays various interactions, such as instant messaging conversations of the first user 108a with other users. The instant messaging conversations may be initiated by the first user 108a, or other users. For example, as shown, the second user 108b sends an instant message to the first user 108a, to share a comment on a recent goal scored by the first user 108a via the IM window 312. In an embodiment, the IM window 312 may enable text-based chatting between the first user 108a and other users across various messaging platforms and communication networks. In an embodiment, the IM window 312 may facilitate game system messaging between the first user 108a and other users. The gaming systems 102a and 102b may be provided with an in-built messaging feature to communicate and/or chat with a plurality of users within the gaming environment. In an embodiment, the IM window 312 may enable social media monitoring to receive social media updates from one or more social networking websites to which the first user 108a subscribes.

Further, as shown in the IM window 312, another player "John3" communicates with the first user 108a, to enquire regarding the latest games in car-racing. In an embodiment, the player "John3" may not be playing the same game as the first user 108a. Further, "John3" may not be aware of the game being played by the first user 108a, and may initiate a random chat with the first user 108a.

In an embodiment, the instant messaging conversations may not be limited to a plurality of users engaged in team-play and may extend to other users not involved in the same team or same game. In an embodiment, the first user 108a may minimize the IM window 312 while playing a game.

In an embodiment, the GUI 300 may display a monitoring window (not shown) that may enable the first user 108a to monitor a plurality of feeds, such as news feeds and/or activities of other users, linked with one or more accounts of the first user 108*a*. In an embodiment, the one or more accounts of the first user 108*a* may be associated with services provided by one or more third-party social media service providers.

The game invitation window 314 displays a group of players sharing game invitations with each other. For example, as shown, the first user 108*a* receives a game invitation from the second user 108*b* (denoted by "Rambo2") regarding the game, "ABC_RACE". Sharing invitations to a plurality of games is not limited to two players and may extend to multiple players. In an embodiment, the game invitations may be sent to non-team players, or random players who may be playing the same game as the first user 108*a*. In an embodiment, the game invitations may be sent to random players, who may be playing a different game from the first user 108*a*. In such a case, the random players may be connected to the communication network 110 via their respective gaming systems. In an embodiment, the first user 108*a* may minimize the game invitation window 314 while involved in gaming.

The third view window 316, the fourth view window 318, and the third player camera view 320 display views associated with a third user, which is similar to the first view window 304, the second view window 306, and the second player camera view 308. The third view window 316 and the fourth view window 318 display plurality of views comprising real-time video feeds of a third player (not shown) associated with the third user engaged in the soccer game. The third player camera view 320 displays a view selected from a plurality of views of the third user captured from the image capturing devices, such as web-cameras installed at the physical location of the third user. In an embodiment, the third user may not be involved in the soccer game or may be playing a different game from the first user 108*a*.

The first user 108*a* may select a first-person view of the third team player belonging to the same team as the first player 302*a*. Based on the selection, the third view window 316 displays the first-person view of the third team player located towards a goalpost of the field. The third view window 316 may display a goalkeeper located at the end of the field based on the location of the third user in the game. Accordingly, the goal-keeper is shown in the region that corresponds to the third view window 316.

Similarly, based on selection of a view from the plurality of views, the first user 108*a* may select an elongated top-view of the game to be displayed on the fourth view window 318. In an embodiment, the fourth view window 318 may display the third user on the captured elongated top-view. The third user may be identified on the captured elongated top-view by an identifier. In an embodiment, the team players of both teams involved in the soccer game may be displayed by suitable identifiers. Such an identification of team players of both the teams may ease planning the next move for the first user 108*a*, based on location of all players scattered on the field.

In an embodiment, the first user 108*a* may observe a specific view of a team player located close to the first player 302*a* within the game. Such a view may ensure passing of a ball to that team player while moving towards a goalpost. In another embodiment, the first user 108*a* may choose to observe a view from the plurality of views provided for a team player based on location of the first player 302*a* in the game.

In an embodiment, the first user 108*a* may customize the GUI 300 of the first display device 104*a*. The first user 108*a* may select the plurality of regions (or windows) to be displayed based on interest. For example, the first user 108*a* may be involved in a car-racing game and may not desire the multimedia-sharing window 310, the IM window 312, and/or the game invitation window 314 to be displayed until the first user 108*a* finishes the car-racing game. In an embodiment, the first user 108*a* may apply settings to the GUI 300 of the first display device 104*a*, such that when the first user 108*a* is involved in gaming, a selected plurality of windows must be minimized until the game concludes. Such settings of the GUI 300 may save effort to apply settings every time the first user 108*a* is engaged in gaming.

Figure 4:
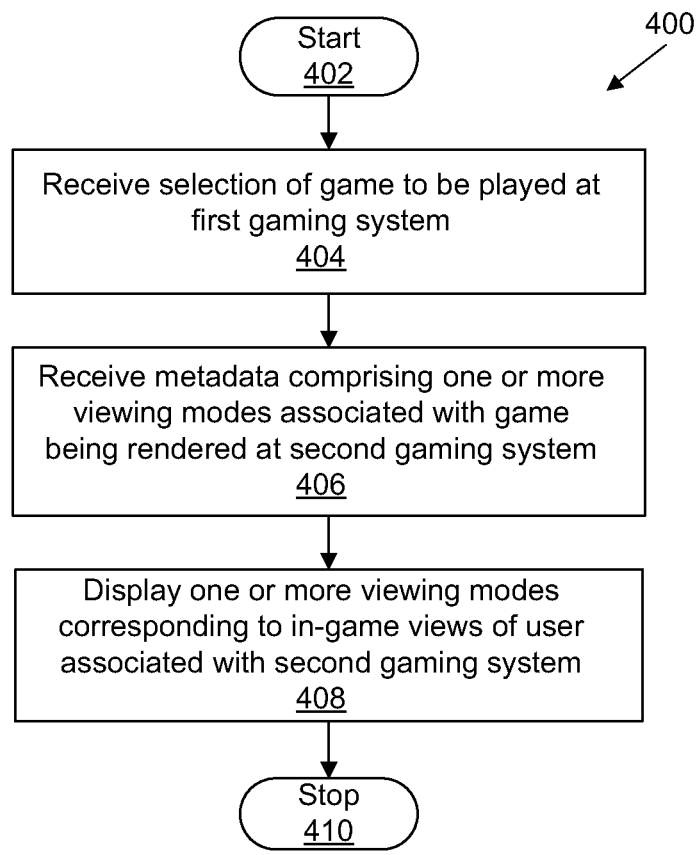
FIG. 4 is a flow chart illustrating exemplary steps for multi-player video gaming, in accordance with an embodiment of the disclosure.

FIG. 4 is a flow chart illustrating exemplary steps for multi-player video gaming, in accordance with an embodiment of the disclosure. FIG. 4 is described in conjunction with elements of FIG. 1, FIG. 2 and FIG. 3. The method 400 may be implemented in the first gaming system 102*a*, which may be communicatively coupled to the remote server 112 via the communication network 110. In an embodiment, the method 400 may be implemented in the first gaming system 102*a*, which may be communicatively coupled to the second gaming system 102*b*.

The method 400 begins at step 402 and proceeds to step 404. At step 404, the selection of a game is received at the first gaming system 102*a*. In an embodiment, the game is selected by the first user 108*a* by pressing a plurality of predetermined buttons on the first remote controller 106*a*, which may be associated with the first gaming system 102*a*.

Based on the received selection of a game, a suitable GUI of the game environment associated with the game may be displayed on the first display device 104*a* via the display controller 206. If the selected game is a multi-player game, the remote server 112 may be connected by the first gaming system 102*a* via the communication network 110. A plurality of users may be connected with the first gaming system 102*a* via such a connection. A connection may be established between the second user 108*b* via a second gaming system 102*b* and the first user 108*a* via the first gaming system 102*a*. In an embodiment, the functionality of the remote server 112 may be performed by the second gaming system 102*b*, or other gaming systems in communication with the first gaming system 102*a*.

At step 406, metadata comprising one or more viewing modes associated with the game being rendered at the second gaming system 102*b*, may be received at the first gaming system 102*a*. The one or more viewing modes correspond to in-game views of the second user 108*b*, which may be associated with the second gaming system 102*b*. In an embodiment, the same game may be played by the second user 108*b* as the first user 108*a*.

At step 408, the viewing modes that correspond to the in-game views of the second user 108*b* associated with the second gaming system 102*b*, may be displayed at the first gaming system 102*a*. In an embodiment, the viewing modes may be displayed simultaneously with a playing area of the game on the first display device 104*a*. Accordingly, a GUI, similar to the GUI 300 shown in FIG. 3, may be displayed on the first display device 104*a*.

In an embodiment, the second gaming system 102*b* may be connected to the remote server 112 via the communication network 110. In such a case, the first gaming system 102*a* and the second gaming system 102*b* may be connected to each other via the communication network 110. In an embodiment, the first gaming system 102*a* and the second gaming system 102*b* may be connected directly to each other. Further, the second user 108*b* may select the same game, "soccer" using the second remote controller 106*b*. In an embodiment, the second user 108b may choose to be a part of the same team as the first user 108a.

In an embodiment, the one or more viewing modes may be rendered on the first display device 104a by resizing the GUI 300 of the first display device 104a into a plurality of regions, as shown in FIG. 3. In another embodiment, the GUI 300 of the first display device 104a may be rendered by utilizing a plurality of additional displays. In such a case, the display functionalities and/or operations may be executed by the processor 202 on each of the plurality of additional display devices.

In an embodiment, each gaming system that is connected to the communication network 110 (FIG. 1) and involved in gaming with the first user 108a (FIG. 1) may be shown one or more viewing modes associated with the first user 108a. In accordance with the present disclosure, a system (FIG. 2) for multi-player video gaming is disclosed. Exemplary aspects of the disclosure may comprise one or more processors and/or circuits, such as the processor 202 (FIG. 2), in the first gaming system 102a (FIG. 1). The processor 202 may be operable to receive metadata from a second gaming system 102b (FIG. 1). The metadata may comprise one or more viewing modes associated with a game being rendered at a second gaming system 102b (FIG. 1). The one or more viewing modes may correspond to in-game views of a second user 108b (FIG. 1) associated with the second gaming system 102b.

Various embodiments of the disclosure may provide a non-transitory computer readable medium and/or storage medium, and/or a non-transitory machine readable medium and/or storage medium. Having applicable mediums stored thereon, a machine code and/or a computer program having at least one code section executable by a machine and/or a computer for multi-player video gaming. The at least one code section in a first gaming system 102a, associated with a user 108a, may cause the machine and/or computer to perform the steps comprising receiving metadata from a second gaming system 102b. The metadata comprises one or more viewing modes associated with a game being rendered at the second gaming system 102b. The one or more viewing modes correspond to in-game views of a second user 108b associated with the second gaming system 102b.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means an expression, in a specified language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
in a first gaming system configured to render a first game and communicatively coupled to a second gaming system, said first gaming system comprising at least one processor and at least one graphics processing unit (GPU),
wherein said at least one processor is configured to:
receive data from said second gaming system corresponding to at least one viewing mode associated with a second game that is rendered at said second gaming system, wherein said at least one viewing mode corresponds to a plurality of real-time views associated with a user of said second gaming system;
receive a user input to select a real-time view of said user from said plurality of real-time views,
wherein each of said plurality of real-time views is captured from a respective viewpoint of said user by an image capturing device located at said second gaming system, and
wherein said at least one GPU is configured to:
vary said plurality of real-time views captured from respective viewpoints of said user based on said second game; and
control display of said plurality of real-time views on a first display device of said first gaming system based on said selected real-time view of said user, wherein said second game rendered at said second gaming system is different from said first game rendered at said first gaming system.

2. The system of claim 1, wherein said at least one viewing mode displayed at said first display device of said first gaming system corresponds to at least one of a plurality of in-game views, a plurality of out-of-game views, or said plurality of real-time views of said user associated with said second gaming system.

3. The system of claim 1, wherein said at least one processor is further configured to concurrently display said at least one viewing mode of said user associated with said second gaming system and said second game that is rendered at said second gaming system.

4. The system of claim 1, wherein said at least one viewing mode corresponding to said user of said second gaming system comprises at least one view of a character associated with said user in said second game.

5. The system of claim 4, wherein said at least one viewing mode corresponding to said user of said second gaming system comprises at least one defined view corresponding to said character in said second game.

6. The system of claim 5, wherein said at least one processor is further configured to switch said at least one view to at least one different view, wherein said at least one different view is selected by a first user of said first gaming system from said at least one defined view that is associated with said user in said second game.

7. The system of claim 1, wherein said at least one viewing mode is displayed on a second display device different from said first display device that is configured to display said second game.

8. The system of claim 1, wherein said at least one processor is further configured to resize a playing area to display a plurality of regions of said first game that is displayed on said first gaming system.

9. The system of claim 8, wherein said at least one processor is further configured to display at least one statistic associated with said first game in one of said plurality of regions of said first display device of said first gaming system.

10. The system of claim 8, wherein said at least one processor is further configured to display said at least one viewing mode associated with said second gaming system in one of said plurality of regions.

11. The system of claim 1, wherein said data comprises at least one of instant messaging data, text-based chatting data, game system messaging data, social media monitoring data, shared images data, audio-video data, or invitations to other games.

12. The system of claim 1, wherein said at least one viewing mode corresponds to at least one real-time video feed associated with said second game rendered at said second gaming system and wherein said at least one viewing mode is displayed on said first display device of said first gaming system.

13. The system of claim 1, wherein said first gaming system is remotely located from said second gaming system.

14. The system of claim 1, wherein said first gaming system is further configured to receive said data from a remote server communicatively coupled to said second gaming system.

15. The system of claim 1, wherein one of said first gaming system or said second gaming system comprises server functionality to facilitate communication with other gaming systems.

16. A method, comprising:
in a first gaming system rendering a first game and communicatively coupled to a second gaming system:
receiving data from said second gaming system corresponding to at least one viewing mode associated with a second game that is rendered at said second gaming system, wherein said at least one viewing mode corresponds to a plurality of real-time views associated with a user of said second gaming system;
receiving a user input to select a real-time view of said user from said plurality of real-time views,
wherein each of said plurality of real-time views is captured from a respective viewpoint of said user by an image capturing device located at said second gaming system;
varying said plurality of real-time views captured from respective viewpoints of said user based on said second game; and
controlling display of said plurality of real-time views on a first display device of said first gaming system based on said selected real-time view of said user,
wherein said second game rendered at said second gaming system is different from said first game rendered at said first gaming system.

17. The method of claim 16, wherein said at least one viewing mode displayed at said first gaming system corresponds to at least one of a plurality of in-game views, a plurality of out-of-game views, or said plurality of real-time views of said user associated with said second gaming system.

18. The method of claim 16, further comprising concurrently displaying said at least one viewing mode of said user associated with said second gaming system and said second game that is rendered at said second gaming system.

19. The method of claim 16, wherein said at least one viewing mode corresponding to said user of said second gaming system comprises at least one defined view of a character associated with said user in said second game.

20. The method of claim 16, wherein said at least one viewing mode corresponds to at least one real-time video feed associated with said second game that is rendered at said second gaming system and wherein said at least one viewing mode is displayed on said first gaming system.

21. A non-transitory computer-readable medium having stored thereon, computer-executable instructions that, when executed by a processor, cause a computer to execute operations, the operations comprising:
in a first gaming system rendering a first game and communicatively coupled to a second gaming system:
receiving data from said second gaming system corresponding to at least one viewing mode associated with a second game that is rendered at said second gaming system, wherein said at least one viewing mode corresponds to a plurality of real-time views associated with a user of said second gaming system;
receiving a user input to select a real-time view of said user from said plurality of real-time views,
wherein each of said plurality of real-time views is captured from a respective viewpoint of said user by an image capturing device located at said second gaming system;
varying said plurality of real-time views captured from respective viewpoints of said user based on said second game; and
controlling display of said plurality of real-time views on a first display device of said first gaming system based on said selected real-time view of said user,
wherein said second game rendered at said second gaming system is different from a first game rendered at said first gaming system.

* * * * *